(12) United States Patent
Ozaki

(10) Patent No.: US 9,184,583 B2
(45) Date of Patent: Nov. 10, 2015

(54) ELECTRIC AUTOMOBILE

(75) Inventor: Takayoshi Ozaki, Iwata (JP)

(73) Assignee: NTN CORPORATION, Osaka (JP)

( * ) Notice: Subject to any disclaimer, the term of this patent is extended or adjusted under 35 U.S.C. 154(b) by 245 days.

(21) Appl. No.: 14/000,364

(22) PCT Filed: Feb. 10, 2012

(86) PCT No.: PCT/JP2012/053059
§ 371 (c)(1),
(2), (4) Date: Aug. 19, 2013

(87) PCT Pub. No.: WO2012/114900
PCT Pub. Date: Aug. 30, 2012

(65) Prior Publication Data
US 2013/0328511 A1    Dec. 12, 2013

(30) Foreign Application Priority Data

Feb. 25, 2011    (JP) .................................. 2011-039491

(51) Int. Cl.
*H02P 23/00*    (2006.01)
*H02H 7/08*    (2006.01)
*B60K 7/00*    (2006.01)
(Continued)

(52) U.S. Cl.
CPC ............ *H02H 7/0833* (2013.01); *B60K 7/0007* (2013.01); *B60K 17/046* (2013.01); *B60L 3/0061* (2013.01); *B60L 3/06* (2013.01); *H02P 29/021* (2013.01); *B60K 2007/0038* (2013.01); *B60K 2007/0092* (2013.01); *B60L 2240/421* (2013.01); *B60L 2240/427* (2013.01);
(Continued)

(58) Field of Classification Search
CPC ... H02P 27/06; H02M 5/4505; B60L 11/1803
USPC .................................. 318/798, 801, 805, 812
See application file for complete search history.

(56) References Cited

U.S. PATENT DOCUMENTS 5,969,919 A *   10/1999   Kobayashi et al. ............. 361/23
7,365,507 B2 *   4/2008   Kim et al. ..................... 318/483
(Continued)

FOREIGN PATENT DOCUMENTS

| | | |
|---|---|---|
| CN | 101005219 | 7/2007 |
| JP | 2004-328819 | 11/2004 |

(Continued)

OTHER PUBLICATIONS

International Search Report mailed May 1, 2012 in corresponding International Application No. PCT/JP2012/053059.
(Continued)

*Primary Examiner* — Rina Duda

(57) ABSTRACT

An electric vehicle includes an inverter unit and an ECU. The inverter unit or the ECU includes a magnetic force estimator that estimates a magnetic force of a permanent magnet structure associated with a motor rotor of a motor unit. The inverter unit or the ECU may also include a determiner for the estimated magnetic force and an abnormalities-responsive motor drive limiter. The estimator is configured to estimate, according to a predefined rule, the magnetic force, based on at least two detection signals selected from a group consisting of a detection signal indicating a rotational frequency of the motor unit, a detection signal indicating a motor voltage of the motor unit and a detection signal indicating a motor current of the motor unit.

10 Claims, 5 Drawing Sheets

(51) Int. Cl.
*B60K 17/04* (2006.01)
*B60L 3/00* (2006.01)
*H02P 29/02* (2006.01)
*B60L 3/06* (2006.01)

(52) U.S. Cl.
CPC ....... *B60L 2240/429* (2013.01); *B60L 2260/44* (2013.01); *Y02T 10/642* (2013.01); *Y02T 10/7258* (2013.01)

(56) References Cited

U.S. PATENT DOCUMENTS

| | | | |
|---|---|---|---|
| 7,759,888 B2 * | 7/2010 | Matsui et al. | 318/400.29 |
| 2009/0000840 A1 * | 1/2009 | Murata | 180/65.5 |
| 2011/0144848 A1 * | 6/2011 | Yoshizue et al. | 701/22 |
| 2011/0248657 A1 * | 10/2011 | Endoh | 318/400.22 |

FOREIGN PATENT DOCUMENTS

| | | |
|---|---|---|
| JP | 2005-192325 | 7/2005 |
| JP | 2006-258289 | 9/2006 |
| JP | 2008-168790 | 7/2008 |
| JP | 2010-110042 | 5/2010 |
| JP | 2010-268566 | 11/2010 |

OTHER PUBLICATIONS

Japanese Notification of Reasons for Rejection issued Aug. 5, 2014 in corresponding Japanese Patent Application No. 2011-039491.
PCT International Preliminary Report on Patentability mailed Sep. 6, 2013 in corresponding International Application No. PCT/JP2012/053059.
U.S. Appl. No. 14/000,373, filed Aug. 19, 2013, Takayoshi Ozaki, NTN Corporation.
U.S. Appl. No. 13/985,925, filed Aug. 16, 2013, Takayoshi Ozaki, NTN Corporation.
U.S. Appl. No. 14/000,379, filed Aug. 19, 2013, Takayoshi Ozaki, NTN Corporation.
U.S. Appl. No. 14/000,295, filed Aug. 19, 2013, Takayoshi Ozaki, NTN Corporation.
U.S. Appl. No. 14/000,783, filed Aug. 21, 2013, Takayoshi Ozaki, NTN Corporation.
Chinese Office Action dated May 5, 2015 in corresponding Chinese Patent Application No. 201280009938.9.

* cited by examiner

OUTBOARD SIDE ← → INBOARD SIDE

ELECTRIC AUTOMOBILE

CROSS REFERENCE TO THE RELATED APPLICATIONS

This application is a U.S. national stage application of PCT/JP2012/053059, filed Feb. 10, 2012, and based on and claims foreign priority benefit of Japanese patent application No. 2011-039491, filed Feb. 25, 2011 in the Japanese Intellectual Property Office, the entire contents of both of which are herein incorporated by reference as a part of this application.

BACKGROUND OF THE INVENTION

1. Field of the Invention

The present invention relates to an electric vehicle, such as an in-wheel motor vehicle, that is equipped with motor(s) to drive wheels and that may be battery-powered or fuel cell-powered.

2. Description of Related Art

An electric vehicle may experience degradation in performance or malfunctions of a motor serving as a drive for the vehicle. This can significantly affect the travel performance or travel safety. In particular, a battery-powered electric vehicle may include a drive system with an IPM (e.g., Interior Permanent Magnet synchronous motor). Such an IPM may include a neodymium magnet to provide a highly efficient performance, thus increasing the maximum travel range that is possible with a limited battery capacity.

In the past, an in-wheel motor drive system has been proposed in which the temperature of components such as a motor may be measured and monitored for overload, with features to limit a drive current in/to the motor or a rotational frequency of the motor according to the temperature measurements, in order to ensure reliability of the system (see the Patent Document 3 listed below).

[Patent Document 1] JP Laid-open Patent Publication No. 2006-258289
[Patent Document 2] JP Laid-open Patent Publication No. 2004-328819
[Patent Document 3] JP Laid-open Patent Publication No. 2008-168790

SUMMARY OF THE INVENTION

A motor for an electric vehicle may include permanent magnet(s). The upper temperature limit of such permanent magnet(s)—in particular, a neodymium magnet—may be relatively low. Irreversible demagnetization may occur if the temperature of the operating environment exceeds the upper temperature limit. This may cause a dramatic reduction in the motor driving performance and may, in extreme cases, lead to a situation where driving of the vehicle is entirely impossible. As is the case with the aforementioned in-wheel motor drive system, the temperature of a motor may be measured and monitored for overload, in order to impose a corresponding limit on driving. However, controls that largely rely on temperature measurements of a motor may not be able to appropriately address degradation in performance of permanent magnet(s) of a motor that may be caused by its/their demagnetization.

An object of the present invention is to provide an electric vehicle which enables appropriate measures to be quickly taken, in response to degradation in performance of a permanent magnet structure of a motor unit that may be caused by its demagnetization. The general aspects of the present invention will now be described using the reference signs in the figures showing embodiments of the present invention.

The present invention may provide an electric vehicle which includes a synchronous motor unit 6 configured to drive a wheel 2. The electric vehicle also includes an ECU 21 which is an electronic control unit configured to perform general control of the vehicle. The electric vehicle also includes an inverter unit 22. The inverter unit 22 includes a power circuitry 28 that includes an inverter 31 configured to convert a DC power from a battery unit into an AC power used to drive the motor unit 6. The inverter unit 22 also includes a motor control circuitry 29 configured to control at least the power circuitry 28 in accordance with control from the ECU 21. The electric vehicle also includes a plurality of sensors 36, 37, 35 including at least two sensors selected from a group consisting of a sensor configured to sense a rotational frequency of the motor unit 6, a sensor configured to sense a motor voltage of the motor unit 6 and a sensor configured to sense a motor current of the motor unit 6. The inverter unit 22 or the ECU 21 includes a magnetic force estimator 38 configured to estimate, according to a predefined rule or relation, a magnetic force of a permanent magnet structure associated with a motor rotor of the motor unit 6, based on at least two detection signals produced from the sensors that are selected from a group consisting of a detection signal indicating a rotational frequency of the motor unit 6, a detection signal indicating a motor voltage of the motor unit 6 and a detection signal indicating a motor current of the motor unit 6.

In a synchronous motor unit 6, rotation of a permanent magnet structure 80 associated with a motor rotor 75 generates an electromotive force in coils 78 of a motor stator. Such an electromotive force increases with stronger magnetic force (i.e., more magnetic flux density) of the permanent magnet structure 80. Hence, the magnetic force of a permanent magnet structure can be calculated based on the rotational frequency and the motor voltage of a motor unit. The electromotive force also influences a motor current of the motor unit. Hence, the magnetic force of a permanent magnet structure can also be calculated based on the rotational frequency and the motor current of a motor unit. The relationship between the electromotive force and the magnetic force of a permanent magnet structure also influences the relationship between the waveform of a motor voltage and the waveform of a motor current of the motor unit. Hence, the magnetic force of a permanent magnet structure can also be calculated based on the motor voltage and the motor current of a motor unit.

The magnetic force estimator 38 can include rule(s) appropriately defining the relationships among a rotational frequency, a motor voltage and a motor current of the motor unit, allowing the magnetic force estimator 38 to estimate, according to a predefined rule, a magnetic force of a permanent magnet structure 80 associated with a motor rotor 75 of the motor unit 6, based on at least two detection signals that are selected from a group consisting of a detection signal indicating a motor current of the motor unit 6, a detection signal indicating a motor voltage of the motor unit 6 and a detection signal indicating a rotational frequency of the motor unit 6. A unit of measurement for a magnetic force—such as magnetic flux density—may be used as a unit of measurement for the estimated magnetic force of a permanent magnet structure 80. The estimated magnetic force, however, may be represented in different ways. For example, the estimated magnetic force may be expressed using numbers that represent magnetic force levels, one of which the estimated magnetic force belongs to. Such a configuration of estimating the magnetic force of a permanent magnet structure 80 of a motor rotor 75 allows for determining reduction in magnetic force of the permanent magnet structure 80 that may be caused by its heat-induced demagnetization, chipping and/or cracking, thus enabling appropriate measures to be taken.

In the present invention, the inverter unit 22 or the ECU 21 may further include a determiner 39 configured to determine if the magnetic force estimated by the magnetic force estimator 38 falls within a defined acceptable range. The acceptable range may be defined so as to correspond to a range of magnetic force that enables a normal operation in a given application or may be defined so as to correspond to a narrower, safer range. Such a determiner 39 allows for determining whether measures should be taken in response to reduction in magnetic force of the permanent magnet structure 80 of the motor unit 6.

The inverter unit 22 or the ECU 21 may further include an abnormalities-responsive motor drive limiter 40 configured to, if the determiner 39 determines that the estimated magnetic force falls outside the defined acceptable range, limit an output of the inverter unit 22. Limiting an output of the inverter unit 22 may include reducing the output level of a drive command such as torque or current or terminating the output entirely. Such a configuration of limiting, if the determiner 39 determines reduction in magnetic force, the output of the inverter unit 22 such as a current command to the motor unit 6 allows for preventing further deterioration of a magnet structure of the motor unit 6. For example, the output power of the motor unit 6 can be reduced or terminated in response to an elevated temperature of the magnet structure caused by the driving of the motor, thus avoiding further increase of the temperature of the magnet structure.

The inverter unit 22 may include the determiner 39, the magnetic force estimator 38 and the abnormalities-responsive motor drive limiter 40. With the configuration of the inverter unit 22 including these components, an appropriate control can be initiated more quickly than with a configuration of the ECU 21 including the same components. Furthermore, with such a configuration, the load on the ECU 21, whose complexity is increasing hand-in-hand with its sophistication, can be reduced.

In a configuration where the inverter unit 22 includes components including the determiner 39, preferably, the inverter unit 22 further includes an abnormalities notifier 41 configured to send information indicating abnormalities to the ECU 21, if the determiner 39 determines that the estimated magnetic force falls outside the defined acceptable range. The ECU 21 performs general control of the vehicle. Thus, in a configuration where the inverter unit 22 may be caused to perform control such as a drive limit control, by notifying the ECU 21 of abnormalities, the ECU 21 can correspondingly perform an appropriate control of the vehicle in general.

In a configuration where the determiner 39 is provided, preferably, the ECU 21 includes an abnormalities display controller 42 configured to, if the determiner 39 determines that the estimated magnetic force falls outside the defined acceptable range, causes a vehicle driver display 27 to show a presentation that indicates abnormalities. Such a configuration of causing a vehicle driver display 27 to show a presentation that indicates abnormalities allows a driver to quickly take appropriate measures or actions such as stopping the vehicle, driving the vehicle at a slower speed, or heading to a repair shop.

In the present invention, the motor unit 6 may include an interior permanent magnet synchronous motor including a neodymium permanent magnet. As discussed earlier, the upper temperature limit of a permanent magnet structure 80 may be relatively low. Irreversible demagnetization may occur if the temperature of the operating environment exceeds the upper temperature limit. This may cause a dramatic reduction in the motor driving performance and may, in extreme cases, lead to a situation where driving of the vehicle is entirely impossible. However, further deterioration of a permanent magnet structure 80 can be prevented by, for example, reducing or terminating the output power of the motor unit 6. In this way, a situation can be avoided in which the driving of the motor unit 6 is entirely impossible, thus allowing a driver to, for example, continue driving the vehicle and head to a repair shop or some place where the vehicle can be fixed.

A wheel bearing unit 4 and a reducer unit 7 may be further provided, and the motor unit 6, together with the wheel bearing unit 4 and the reducer unit 7, may form an in-wheel motor drive system 8 that is partly or entirely disposed within the wheel 2. An in-wheel motor drive system 8, due to its smaller size, may include a motor unit 6 that generates rapid rotation. Rapid rotation of a motor unit 6 may lead to increase in eddy current-induced core loss, which means increase of the heat that may be generated by eddy current loss. This may result in an elevated temperature of a permanent magnet structure 80 of the motor unit 6, thus facilitating heat-induced demagnetization of the permanent magnet structure 80. A magnetic force estimator 38 according to the present invention can be more effective in such a situation.

In the present invention, a reducer unit 7 configured to produce rotation with a speed that is reduced with respect to that of rotation of the motor unit 6 may be provided, wherein the reducer unit 7 may have a reduction ratio of 6 or greater. A reducer unit 7 configured to produce rotation with a speed that is reduced with respect to that of rotation of the motor unit 6 may be provided, wherein the reducer unit 7 may include a cycloidal reducer. A cycloidal reducer can achieve a significant reduction ratio. With such a significant reduction ratio, a smaller motor unit 6 may be employed. However, such a smaller motor unit 6 may involve rapid rotation, thus resulting in increase of the heat that may be generated by eddy current loss. A magnetic force estimator 38 according to the present invention can be more effective in such a situation.

The present invention encompasses any combination of at least two features disclosed in the claims, the specification and/or the drawings. In particular, the present invention encompasses any combination of at least two claims.

BRIEF DESCRIPTION OF THE DRAWINGS

In any event, the present invention will become more clearly understood from the following description of embodiments thereof, when taken in conjunction with the accompanying drawings. However, the embodiments and the drawings are given only for the purpose of illustration and explanation, and are not to be taken as limiting the scope of the present invention in any way whatsoever, as defined by the appended claims. In the accompanying drawings, like reference numerals are used to denote like parts throughout the several views, and:

DESCRIPTION OF THE EMBODIMENTS

Figure 1:
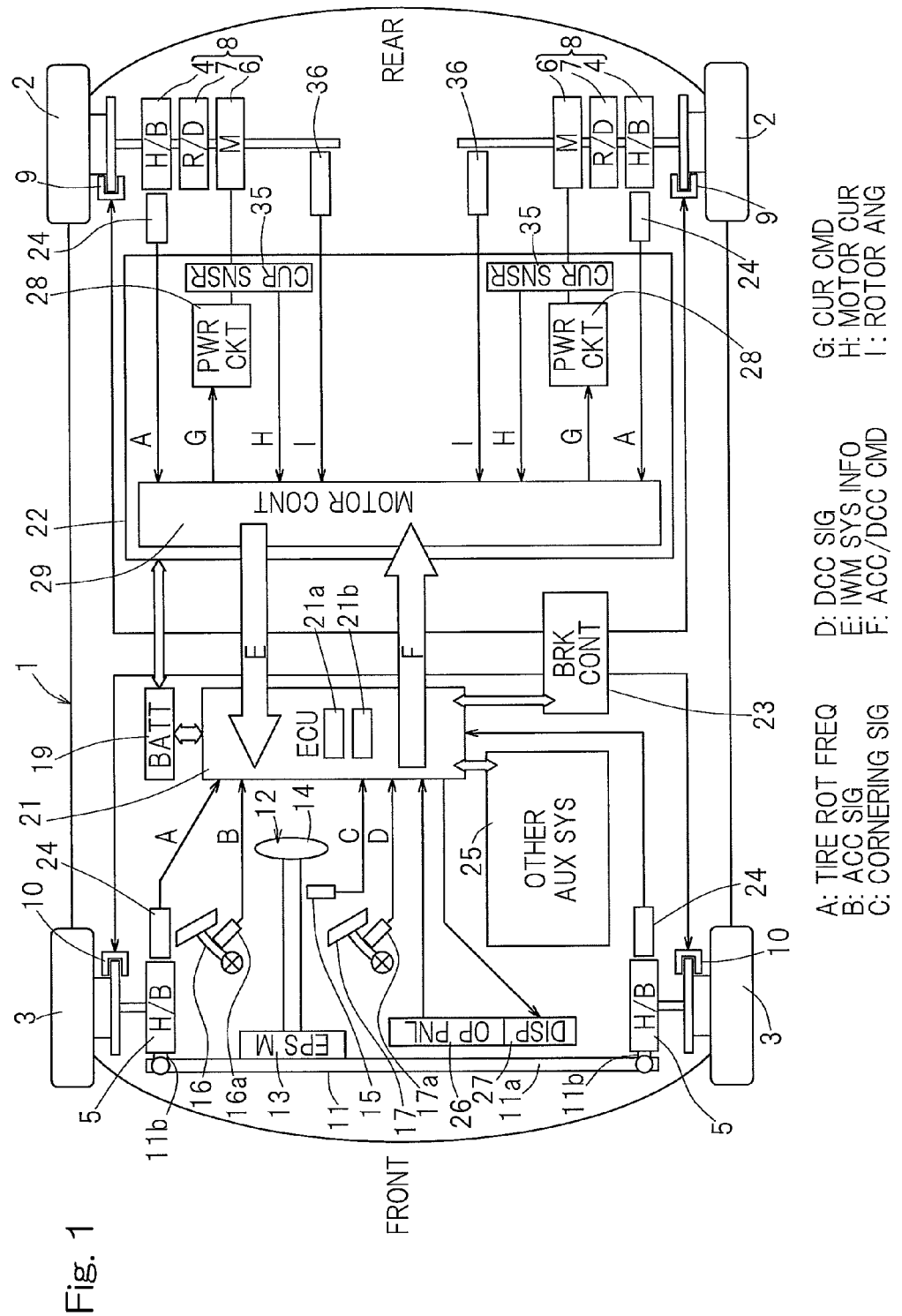
FIG. 1 is a block diagram of a schematic configuration of an electric vehicle, as viewed from top, according to an embodiment of the present invention.

One embodiment of the present invention will now be described in connection with FIG. 1 to FIG. 6. The illustrated electric vehicle is a four-wheel vehicle that includes a vehicle body 1 with left and right rear wheels 2 and left and right front wheels 3, with the rear wheels 2 being drive wheels and the front wheels 3 being steered driven wheels. The drive wheels 2 and the driven wheels 3, both equipped with tires, are supported by the vehicle body 1 via respective wheel bearing units 4, 5. In FIG. 1, the wheel bearing units 4, 5 are labeled with "H/B" which is an abbreviation for hub bearing. The left and right drive wheels 2, 2 are driven by respective independent traction motor units 6, 6. Rotation of a motor unit 6 is transmitted via a reducer unit 7 and a wheel bearing unit 4 to a wheel 2. The motor unit 6, the reducer unit 7 and the wheel bearing unit 4 are integrally assembled with each other to form an in-wheel motor drive system 8 that is partly or entirely disposed within the wheel 2. The in-wheel motor drive system 8 may be referred to as an in-wheel motor unit. The motor unit 6 may, without the interposition of the reducer unit 7, directly drive the wheel 2 into rotation. The wheels 2, 3 are equipped with respective electromechanical brakes 9, 10.

The left and right front steered wheels 3, 3 are turnable via a turning mechanism 11 and are steered with a steering mechanism 12. The turning mechanism 11 includes left and right knuckle arms 11b, 11b holding the respective wheel bearing units 5 and also includes a tie rod structure 11a configured to be laterally displaced to change the angles of the left and right knuckle arms 11b, 11b. The lateral movement of the turning mechanism 11 may be caused by a command from the steering mechanism 12, which drives an EPS (Electric Power Steering) motor 13, and via a rotary to linear motion converter mechanism (not shown). A steering angle sensor 15 is configured to sense a steering angle. The output of the steering angle sensor 15 is sent to the ECU 21 in which the sensed information may be used to generate an accelerating/decelerating command for left and right wheels.

Figure 2:
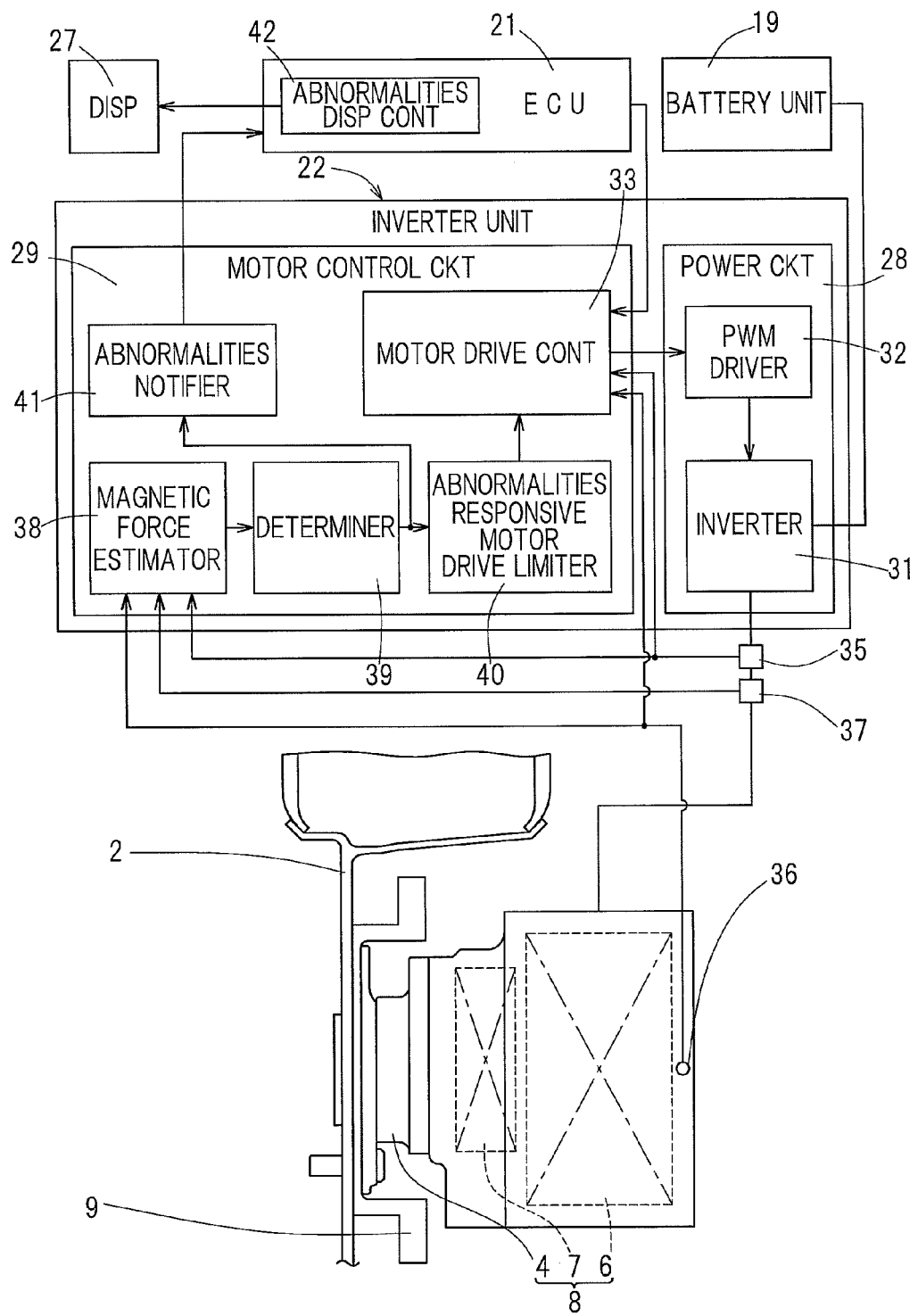
FIG. 2 is a block diagram of a schematic configuration of an inverter unit for the electric vehicle.
Figure 3:
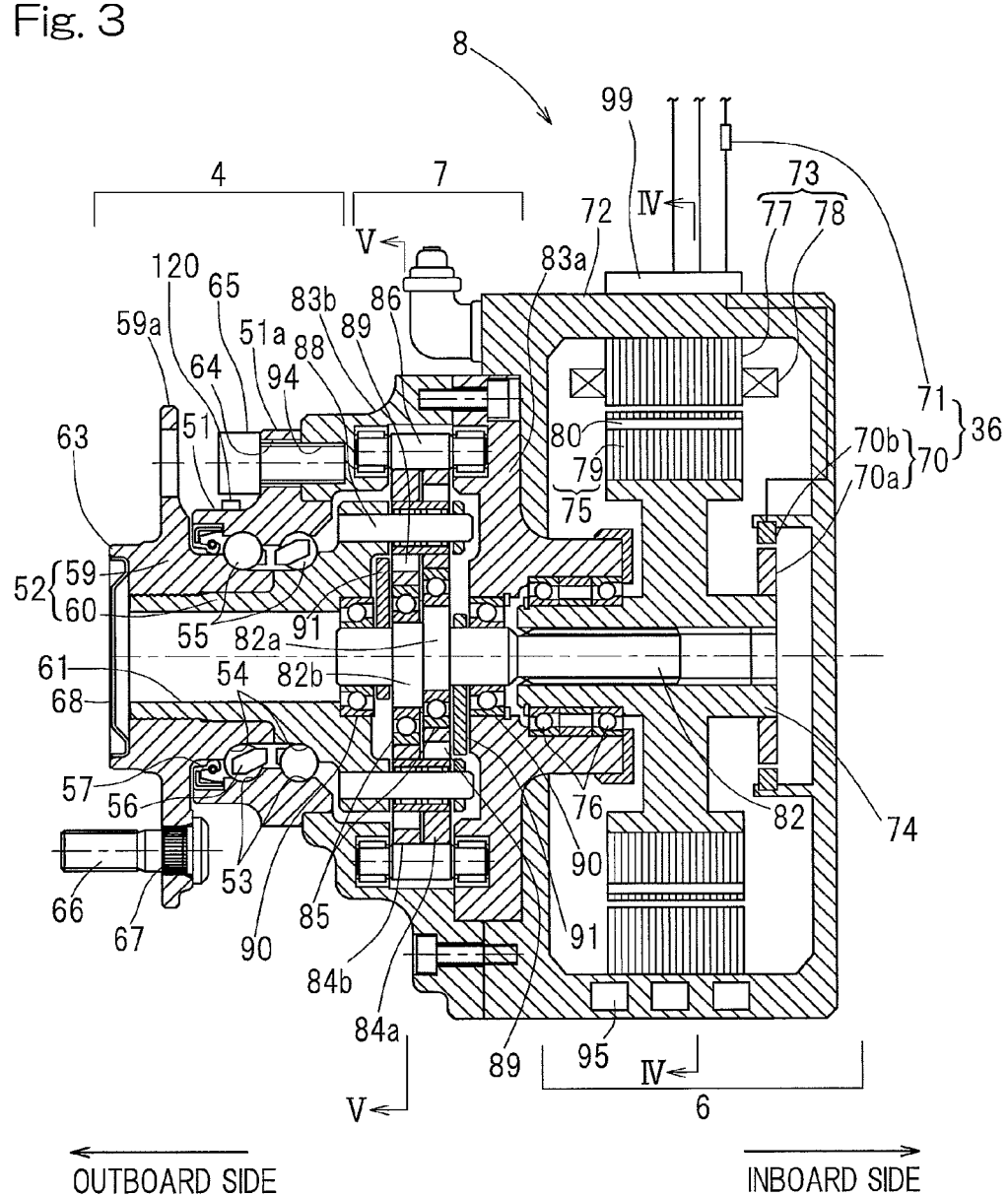
FIG. 3 is a front cut-away view of an in-wheel motor drive system for the electric vehicle.

The in-wheel motor drive system 8 as shown in FIG. 3 includes a wheel bearing unit 4, a motor unit 6 and a reducer unit 7 interposed between the wheel bearing unit 4 and the motor unit 6, in which the hub of a drive wheel 2 (FIG. 2) supported by the wheel bearing unit 4 is coaxially coupled with a rotational output shaft 74 of the motor unit 6 (FIG. 3). Preferably, the reducer unit 7 has a reduction ratio of 6 or greater. The illustrated reducer unit 7 includes a cycloidal reducer which includes a rotational input shaft 82 coaxially connected to the rotational output shaft 74 of the motor unit 6. The rotational input shaft 82 has eccentric segments 82a, 82b. The cycloidal reducer also includes curvilinear plates 84a, 84b mounted via respective bearings 85 to the eccentric segments 82a, 82b, in such a way to transmit the eccentric motions of the curvilinear plates 84a, 84b in the form of a rotary motion to the wheel bearing unit 4. It is to be noted that hereinafter in this specification, terms "outboard" and "inboard" represent one side of the vehicle body away from the longitudinal center of the vehicle body and the other side of the vehicle body close to the longitudinal center of the vehicle body, respectively, when assembled in the vehicle body.

The wheel bearing unit 4 includes an outer member 51 having an inner periphery formed with a plurality of rows of raceway surfaces 53, an inner member 52 having an outer periphery formed with raceway surfaces 54 held in face to face relation to those raceway surfaces 53, and a plurality of rows of rolling elements 55 that are interposed between the raceway surfaces 53 of the outer member 51 and the raceway surfaces 54 of the inner member 52. The inner member 52 concurrently serves as a hub for mounting a drive wheel. The illustrated wheel bearing unit 4 includes a double row angular contact ball bearing, in which the rolling elements 55 are in the form of balls rollingly retained by a retainer 56 that is provided one for each row of the balls. The raceway surfaces 53 and 54 have arcuate cross sectional shapes and are formed to have respective contact angles held in back-to-back relation with each other. The outer member 51 and the inner member 52 define an annular bearing space therebetween, and an outboard end of the annular bearing space is sealed by a sealing member 57.

The outer member 51, which serves as a stationary member, is of one piece construction having a flange 51a for attaching to an outboard housing 83b of the reducer unit 7. The flange 51a has bolt insertion holes 64 formed at a plurality of circumferential locations thereof. The housing 83b has bolt receiving holes 94 that are internally threaded at locations thereof corresponding to the respective bolt insertion holes 64. The outer member 51 can be mounted to the housing 83b by screwing into the bolt receiving holes 94 the mounting bolts 65 that are pre-inserted in the bolt insertion holes 64.

The inner member 52, which serves as a rotational member, includes an outboard member 59 having a hub flange 59a for attaching a wheel. The inner member 52 also includes an inboard member 60 which has an outboard side fitted to an inner periphery of the outboard member 59 and which is crimped to be integrated with the outboard member 59. The outboard member 59 and the inboard member 60 have the corresponding rows of the raceway surfaces 54 formed thereon. The inboard member 60 has a center thereof formed with a through bore 61. The hub flange 59a has force-fitting holes 67 at a plurality of circumferential locations thereof for receiving corresponding hub bolts 66. The outboard member 59 has a cylindrical pilot portion 63 for guiding a drive wheel and brake components (both not shown), which is located in the vicinity of the root of the hub flange 59a of the outboard member 59 and is protruding towards the outboard side. A cap 68 closing an outboard end of the through bore 61 is fitted to an inner periphery of the pilot portion 63.

The illustrated motor unit 6 includes a radial-gap type, IPM motor (e.g., an Interior Permanent Magnet synchronous motor) that includes a motor stator 73 fitted to a cylindrical motor housing 72 and also includes a motor rotor 75 mounted to the rotational output shaft 74, with a radial gap provided between the motor stator 73 and the motor rotor 75. The rotational output shaft 74 is cantilevered via two bearings 76 to a cylindrical segment of the inboard housing 83a of the reducer unit 7. Coolant fluid channel(s) 95 is/are formed in a peripheral wall of the motor housing 72. The flow of a lubricant or a water-soluble coolant in the coolant fluid channel(s) 95 can cool the motor stator 73.

Figure 4:
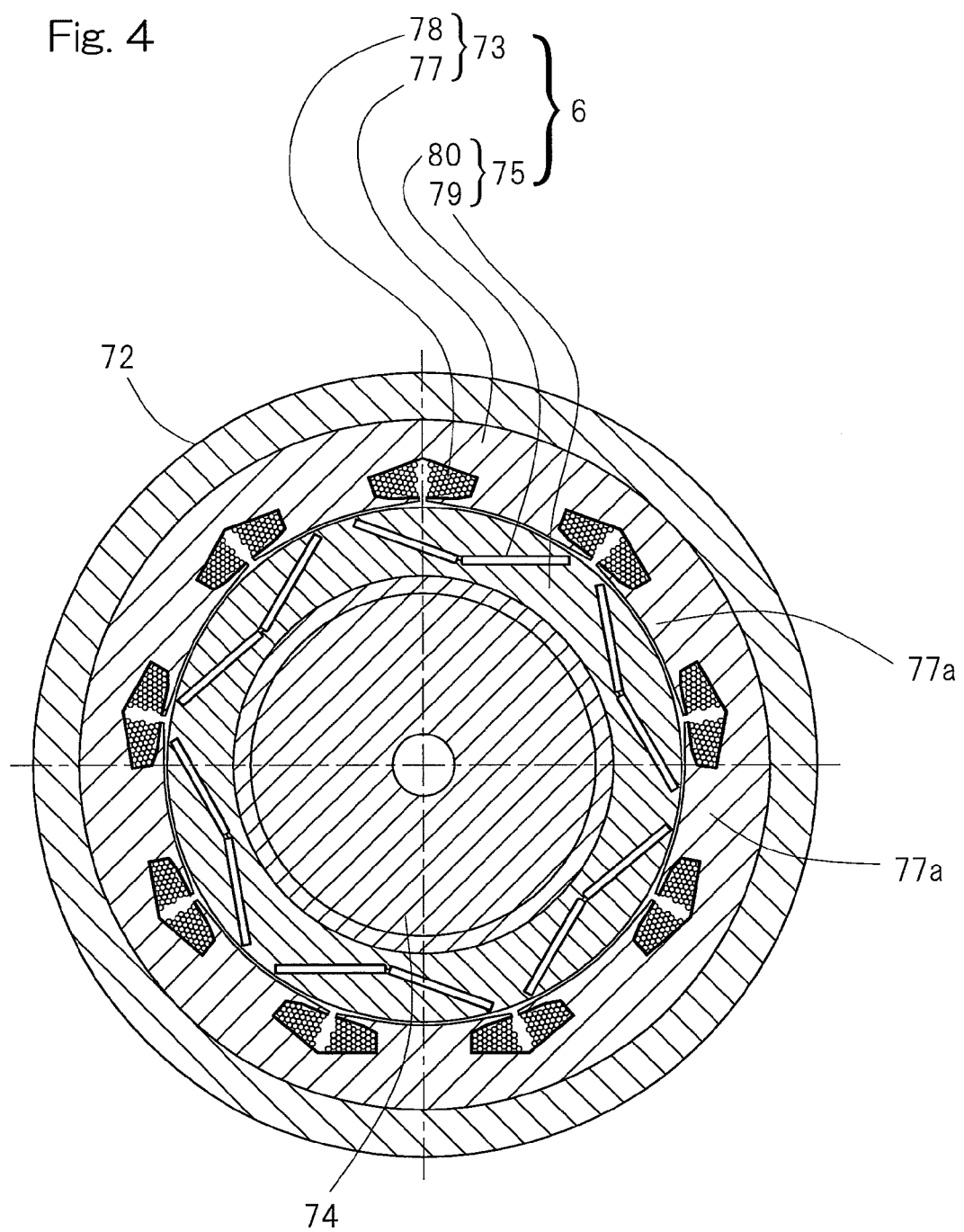
FIG. 4 is a longitudinal cross sectional view of FIG. 3 taken along the line IV-IV, illustrating a motor.

FIG. 4 shows a longitudinal cross sectional view of a motor (taken along the line IV-IV in FIG. 3). The motor rotor 75 of the motor unit 6 may include a rotor core body 79 made of soft magnetic material and may also include a permanent magnet structure 80 incorporated in the rotor core body 79. The permanent magnet structure 80 may include permanent magnets including pairs of two neighboring opposed permanent magnets arranged in circular fashion in the rotor core body 79, where, in each of the pairs, the distance between two neighboring opposed permanent magnets increases along a length of the opposed permanent magnets, as viewed in a cross section thereof. The permanent magnet structure 80 may include a neodymium magnet. The motor stator 73 may include a stator core body 77 made of soft magnetic material and may also include coils 78. The stator core body 77 has a ring-shaped outer peripheral surface having a circular cross section. The stator core body 77 also has an inner peripheral surface having a circumferentially arranged plurality of teeth 77a formed therein that are protruding radially inwards. The coils 78 are wound around the corresponding teeth 77a of the stator core body 77.

The motor unit 6 as shown in FIG. 3 is associated with an angle sensor 36 configured to sense a rotational angle of the motor rotor 75 relative to the motor stator 73. The angle sensor 36 includes an angle sensor body 70 configured to sense signals representing a rotational angle of the motor rotor 75 relative to the motor stator 73 for output and also includes an angle calculation circuit 71 configured to calculate a rotational angle based on the signals produced from the angle sensor body 70. The angle sensor body 70 includes a detectable element 70a associated with the outer peripheral surface of the rotational output shaft 74 and also includes a detector element 70b associated with the motor housing 72. For example, the detector element 70b may be positioned adjacent the detectable element 70a in a radially opposed fashion. The detectable element 70a and the detector element 70b may be positioned adjacent each other in an axially opposed fashion. Here, the angle sensor 36 may include a resolver. To maximize the efficiency of the illustrated motor unit 6, a motor drive controller 33 of a motor control circuitry 29 may be configured to control the timings at which respective phase alternating currents are supplied to the coils 78 of the motor stator 73, based on the rotational angle of the motor rotor 75 relative to the motor stator 73 as sensed by the angle sensor 36.

A connector 99 may be formed at the motor housing 72 for connection of the wires for a motor current in the in-wheel motor drive system 8, wires for various sensors, wires for various commands, and etc.

Figure 5:
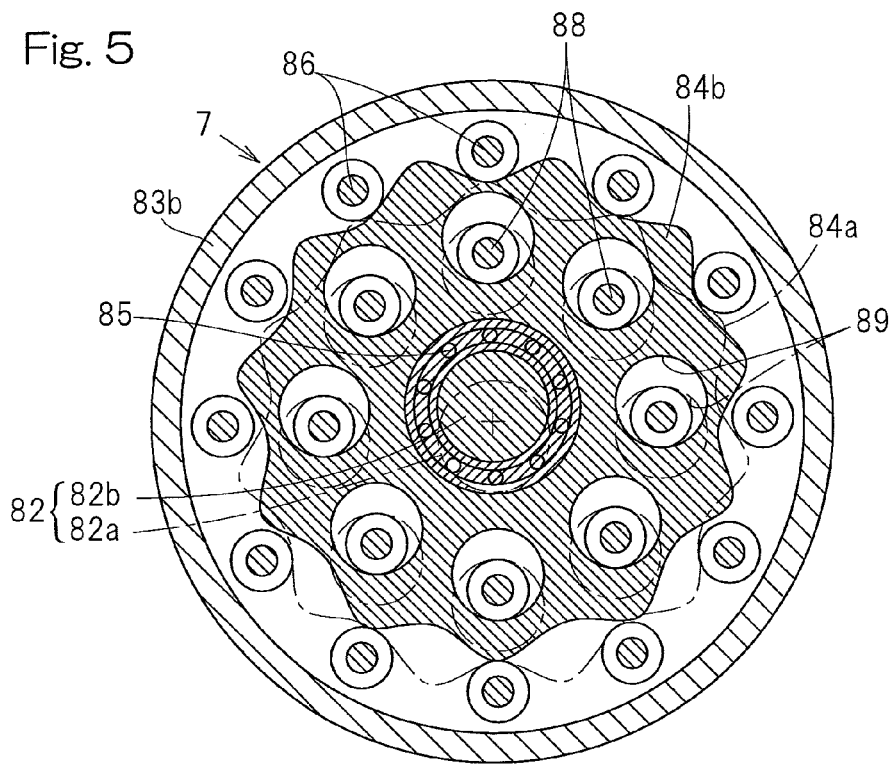
FIG. 5 is a longitudinal cross sectional view of FIG. 3 taken along the line V-V, illustrating a reducer.

The illustrated reducer unit 7 includes a cycloidal reducer as described. As shown in FIG. 5 the cycloidal reducer includes two curvilinear plates 84a, 84b, each having an outer contour defined by a smoothly corrugated trochoidal curve, that are mounted via respective bearings 85 to the eccentric segments 82a, 82b of the rotational input shaft 82. A plurality of outer pins 86 are fitted to the housing 83b to directly or indirectly guide, along the outer peripheries thereof, the eccentric motions of the curvilinear plates 84a and 84b. A plurality of inner pins 88, which are fitted to the inboard member 60 of the inner member 52, are inserted to a plurality of corresponding, round through holes 89 formed in each of the curvilinear plates 84a and 84b, to directly or indirectly engage with the through holes 89. The rotational input shaft 82 is splinedly connected to the rotational output shaft 74 of the motor unit 6 for co-rotation. The rotational input shaft 82 is supported on both sides thereof, via two bearings 90, by an inboard housing 83a and by an inner diameter surface of the inboard member 60 of the inner member 52, respectively.

Rotation of the rotational output shaft 74 of the motor unit 6 causes the curvilinear plates 84a, 84b, associated with the rotational input shaft 82 that co-rotates with the rotational output shaft 74, to make eccentric motions. The eccentric motions of the curvilinear plates 84a, 84b are, through the inner pins 88 directly or indirectly engaging with the through holes 89, transmitted in the form of a rotary motion to the inner member 52. The speed of rotation of the inner member 52 is reduced with respect to that of rotation of the rotational output shaft 74. For example, a single-stage reducer unit having such a configuration can achieve a reduction ratio of 10 or greater.

The two curvilinear plates 84a, 84b are mounted, 180° out of phase with each other, to the eccentric segments 82a and 82b of the rotational input shaft 82, so that the eccentricity of the motions of the curvilinear plates 84a, 84b can be cancelled. Counterweights 91 associated with the respective eccentric segments 82a, 82b, are each disposed at a side of the corresponding one of the eccentric segments 82a, 82b, in such a way that the counterweights 91 face each other across the eccentric segments 82a, 82b while each of the counterweights 91 being displaced in a direction opposite to the direction of displacement of the corresponding one of the eccentric segments 82a, 82b. In this way, vibrations that may be caused by the curvilinear plates 84a, 84b can be cancelled out.

Figure 6:
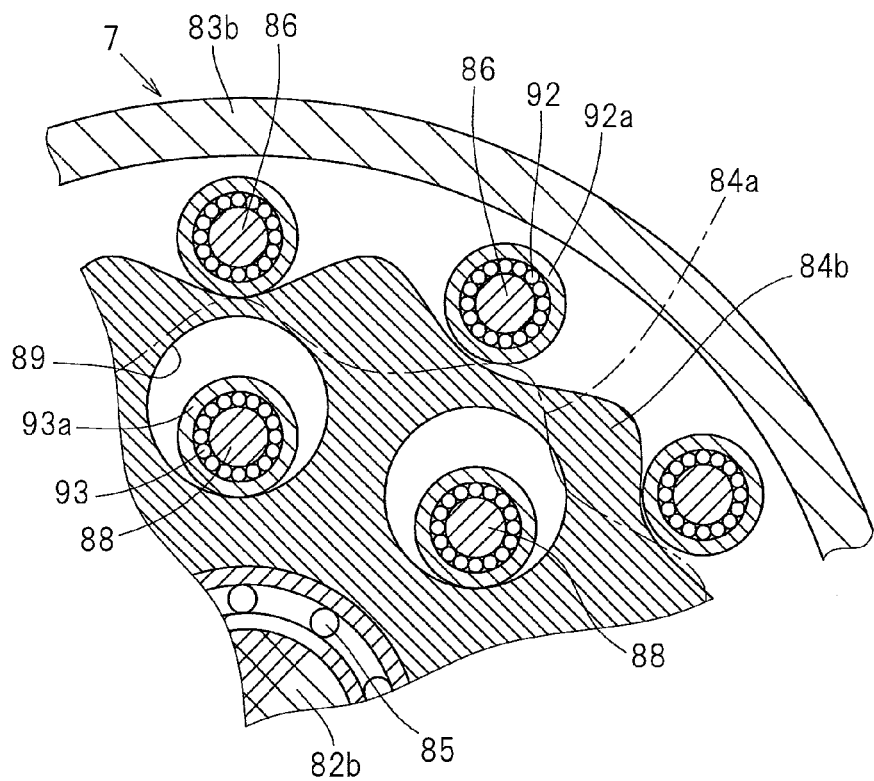
FIG. 6 is a fragmentary enlarged cross sectional view of FIG. 5.

As shown on an enlarged scale in FIG. 6, bearings 92 and bearings 93 may be fitted to the outer pins 86 and the inner pins 88, respectively. The outer rings 92a of the bearings 92 are in rolling contact with the outer peripheries of the curvilinear plates 84a, 84b, while the outer rings 93a of the bearings 93 are in rolling contact with the inner peripheries of the through holes 89. This can minimize the contact friction between the outer pins 86 and the outer peripheries of the curvilinear plates 84a, 84b and the contact friction between the inner pins 88 and the inner peripheries of the through holes 89, thus allowing for smoother transmission of the eccentric motions of the curvilinear plates 84a, 84b in the form of a rotary motion to the inner member 52.

The wheel bearing unit 4 of the in-wheel motor drive system 8 as shown in FIG. 3 is secured to a vehicle body through the connection between a suspension system (not shown) such as a knuckle and the housing 83b of the reducer unit 7 or an outer periphery of the housing 72 of the motor unit 6.

Referring to FIG. 1, a control system will be briefly discussed. The illustrated vehicle body 1 is equipped with an ECU 21 which is an electronic control unit configured to perform general control of the vehicle, an inverter unit 22 configured to perform control of the traction motor units 6, 6 according to commands from the ECU 21, and a braking controller unit 23. The ECU 21 may include a computer, programs that may be executed by the computer, and various electronic circuits.

The ECU 21 may be generally divided, in terms of their functions, into a drive control subunit 21a and a general control subunit 21b. The drive control subunit 21a is configured to generate an accelerating/decelerating command, which will influence the traction motor units 6, 6 of the left and right wheels, based on an accelerating signal produced from an accelerator manipulation unit 16, a decelerating signal produced from a brake manipulation unit 17, and a cornering signal produced from the steering angle sensor 15, and to send the accelerating/decelerating command to the inverter unit 22. In addition, the drive control subunit 21a may be configured to correct the accelerating/decelerating command, based on information indicating the rotational frequency of tire(s) produced from rotation sensor(s) 24 that is/are operatively associated with the wheel bearing units 4, 5 for the respective wheels 2, 3 and/or information produced from various sensors that may be mounted to the vehicle. The accelerator manipulation unit 16 includes an accelerator pedal and a sensor 16a configured to sense the depression of the accelerator pedal to generate the aforementioned accelerating signal. The brake manipulator unit 17 includes a brake pedal and a sensor 17a configured to sense the depression of the brake pedal to generate the aforementioned decelerating signal.

The general control subunit 21b of the ECU 21 is configured to send the decelerating command produced from the brake manipulator unit 17 to the to braking controller unit 23, control various auxiliary systems 25, process input signals from an operation panel 26 on a console, cause a display 27 to show a information, and/or etc. The display 27 may be configured to show an image; for example, the display 27 may comprise a liquid crystal display. Examples of the auxiliary systems 25 include an air conditioner, a lamp, a wiper, a GPS, and an airbag. In FIG. 1, the auxiliary systems 25 are indicated in general by a single block.

The braking controller unit 23 is configured to send a braking command to the brakes 9, 10 equipped to the wheels 2, 3, according to the decelerating command received from the ECU 21. Commands related to braking produced from the ECU 21 may include, other than commands generated based on the decelerating signal produced from the brake manipulator unit 17, a command generated by a safety enhancement subunit that may be included in the ECU 21. The braking controller unit 23 may also include an anti-lock-braking system. The braking controller unit 23 may include electronic circuits and/or a microcomputer.

The inverter unit 22 includes a power circuitry 28, which may be provided one for each of the motor units 6, and a motor control circuitry 29 configured to control the power circuitry/circuitries 28. A common motor control circuitry 29 may be provided for different power circuitries 28. Independent motor control circuitries 29 may be provided for respective different power circuitries 28. Such a common motor control circuitry 29 will be configured to control the different power circuitries 28 independently of each other, for example, to achieve different motor torques. The motor control circuitry 29 may be configured to send various information related to the in-wheel motor 8 (which may be referred to as "IWM system information") held by the motor control circuitry 29, such as a variety of detected values or various control values, to the ECU.

FIG. 2 is a block diagram of a schematic configuration of the inverter unit 22. The illustrated power circuitry 28 include an inverter 31 configured to convert a DC power from a battery unit 19 into a three-phase AC power used to drive the motor unit 6 and also include a PWM driver 32 configured to control the inverter 31. The motor unit 6 may include a three-phase synchronous motor. The inverter 31 may include a plurality of semiconductor switching devices (not shown). The PWM driver 32 may be configured to perform pulse width modulation on a received current command by generating ON/OFF commands to the semiconductor switching devices.

The motor control circuitry 29 may include a computer, programs that may be executed by the computer, and various electronic circuits. The motor control circuitry 29 may include a motor drive controller 33 which serves as a basic control component. The motor drive controller 33 may be configured to receive the accelerating/decelerating command such as a torque command from the ECU which serves as an upper-level control unit, convert the accelerating/decelerating command into a current command, and send the current command to the PWM driver 32 of the power circuitry 28. The motor drive controller 33 may be configured to obtain a motor current that flows from the inverter 31 to the motor unit 6, with a current sensor 35, and perform a current feedback control. The motor drive controller 33 may be configured to obtain a rotational angle of the motor unit 6, with an angle sensor 36, and perform a vector control.

In the embodiment under discussion, the motor control circuitry 29 may include a magnetic force estimator 38, a determiner 39, an abnormalities-responsive motor drive limiter 40 and an abnormalities notifier 41, and the ECU 21 may include an abnormalities display controller 42, as described below. In a variant, the ECU 21 may include a magnetic force estimator 38, a determiner 39, and an abnormalities-responsive motor drive limiter 40.

A magnetic force estimator 38 may estimate, according to a predefined rule or relation, a magnetic force of a permanent magnet structure 80 associated with a motor rotor of the motor unit 6, based on at least two detection signal outputs selected from a group consisting of an output of an angle sensor 36 configured to sense a rotational angle and/or a rotational frequency of the motor unit 6, an output of a voltage sensor 37 configured to sense a motor voltage of the motor unit 6 and an output of a current sensor 35 configured to sense a motor current of the motor unit 6—in other words, based on at least two detection signals selected from a group consisting of a detection signal indicating a rotational frequency of the motor unit 6, a detection signal indicating a motor voltage of the motor unit 6 and a detection signal indicating a motor current of the motor unit 6.

In a synchronous motor unit 6, rotation of a permanent magnet structure associated with a motor rotor generates an electromotive force in coils 78 of a motor stator. Such an electromotive force increases with stronger magnetic force or more magnetic flux density of the permanent magnet structure 80. Hence, the magnetic force of a permanent magnet structure can be calculated based on comparison between the rotational frequency and the motor voltage of a motor unit. The electromotive force also influences a motor current of the motor unit. Hence, the magnetic force of a permanent magnet structure can also be calculated based on comparison between the rotational frequency and the motor current of a motor unit. The magnetic force of a permanent magnet structure also influences the relationship between the waveform of a motor voltage and the waveform of a motor current of the motor unit. Hence, the magnetic force of a permanent magnet structure can also be calculated based on comparison between the motor voltage and the motor current of a motor unit.

The magnetic force estimator 38 can include rule(s) appropriately defining the relationships among a rotational frequency, a motor voltage and a motor current of the motor unit, allowing the magnetic force estimator 38 to estimate, according to a predefined rule, a magnetic force of a permanent magnet structure 80 associated with a motor rotor 75 of the motor unit 6, based on at least two detection signals that are selected from a group consisting of a detection signal indicating a motor current of the motor unit 6, a detection signal indicating a motor voltage of the motor unit 6 and a detection signal indicating a rotational frequency of the motor unit 6. A unit of measurement for a magnetic force—such as magnetic flux density—may be used as a unit of measurement for the estimated magnetic force of a permanent magnet structure 80. The estimated magnetic force, however, may be represented in different ways. For example, the estimated magnetic force may be expressed using numbers that represent magnetic force levels, one of which the estimated magnetic force belongs to.

The magnetic force estimator 38 may be configured to carry out any one of comparison between the rotational frequency and the motor voltage of the motor unit 6, comparison between the rotational frequency and the motor current of a motor unit 6 and comparison between the waveform of the motor voltage and the waveform of the motor current of a motor unit 6 to perform the aforementioned estimation of a magnetic force of a permanent magnet structure 80.

The determiner 39 may determine if the magnetic force estimated by the magnetic force estimator 38 falls within a defined acceptable range. The acceptable range may be defined so as to correspond to a range of magnetic force that enables a normal operation in a given application or may be defined so as to correspond to a narrower, safer range. The determiner 39 may be configured to, in addition to determining if the magnetic force estimated by the magnetic force estimator 38 falls within a defined acceptable range, determine if the estimated magnetic force falls within a defined safer range that is narrower than the defined acceptable range—for example, whether or not the estimated magnetic force is, though being within the defined acceptable range, in close proximity to the upper or lower limit of the defined acceptable range. Such a safer range can be appropriately defined for a given application.

The abnormalities-responsive motor drive limiter 40 may, if the determiner 39 determines that the estimated magnetic force falls outside the defined acceptable range, limit an output of the inverter unit 22. Limiting an output of the inverter unit 22 by the abnormalities-responsive motor drive limiter 40 may include reducing the output level of a drive command, such as torque or current, that is produced from the motor drive controller 33 or the PWM driver 32 or entirely terminating the output of the motor drive controller 33 or the PWM driver 32. Limiting an output of the inverter unit 22 by the abnormalities-responsive motor drive limiter 40 may include shutting off of the output of the inverter 31. Preferably, the motor unit 6 is configured to be freely rotatable as a result of such termination of the driving of the motor unit 6.

The abnormalities notifier 41 may send information indicating abnormalities to the ECU 21, if the determiner 39 determines that the magnetic force estimated by the magnetic force estimator 38 falls outside the defined acceptable range.

The abnormalities display controller 42, which may be included in the ECU 21, may, in response to the information indicating abnormalities produced from the abnormalities notifier 41, causes a vehicle driver display 27 to show a presentation that indicates abnormalities. In a configuration where the ECU 21 includes the determiner 39, the determiner 39 may be configured to cause a vehicle driver display 27 to show such a presentation that indicates abnormalities, upon determining that the estimated magnetic force falls outside the defined acceptable range. The presentation that can be shown on the display 27 may include a presentation with letters and/or symbols, such as an icon. In a configuration where the determiner 39 is configured to determine if the estimated magnetic force falls within a defined safer range such as discussed earlier, preferably, the abnormalities display controller 42 is configured to, in response to a determination result produced from the determiner 39, cause a corresponding presentation to be shown—for example, a presentation which indicates that the estimated magnetic force, though being within the defined acceptable range, falls outside the defined safer range.

The following discussion deals with how a magnetic force may be estimated and what operation(s) may be carried out according to the estimation result, in connection with the aforementioned configuration. The magnetic force estimator 38 may continuously estimate, according to a predefined rule, the magnetic force of a permanent magnet structure 80 of the motor rotor 75 of the motor unit 6, based on the respective outputs of sensors 35, 36, 37 (e.g., using at least two outputs selected from these outputs). The determiner 39 may monitor the estimation result and determine if the magnetic force estimated by the magnetic force estimator 38 falls within a defined acceptable range. The abnormalities-responsive motor drive limiter 40 may, in response to a determination result that the estimated magnetic force falls outside the defined acceptable range, limit an output of the inverter unit 22, while the abnormalities notifier 41 may notify the ECU 21 of abnormalities. The abnormalities display controller 42, which may be included in the ECU 21, may, in response to the notification of abnormalities, cause a vehicle driver display 27 to show a presentation that indicates abnormalities. In addition, the ECU 21 may perform various controls to implement the supplemental operation(s) of the abnormalities-responsive motor drive limiter 40 to limit the output of the inverter unit 22.

In this way, the output of the inverter unit 22 such as a current command to the motor unit 6 can be limited, if the determiner 39 determines reduction in magnetic force. This allows for preventing further deterioration of a magnet structure of the motor unit 6. For example, the output power of the motor unit 6 can be reduced or terminated in response to an elevated temperature of the magnet structure caused by the driving of the motor, thus avoiding further increase of the temperature of the magnet structure.

For instance, the motor unit 6 may include an interior permanent magnet synchronous motor including a neodymium permanent magnet structure 80. As discussed earlier, the upper temperature limit of a permanent magnet structure 80 may be relatively low. Irreversible demagnetization may occur if the temperature of the operating environment exceeds the upper temperature limit. This may cause a dramatic reduction in the motor driving performance and may, in extreme cases, lead to a situation where driving of the vehicle is entirely impossible. However, further deterioration of a permanent magnet structure 80 can be prevented by, for example, reducing or terminating the output power of the motor unit 6. In this way, a situation can be avoided in which the driving of the motor unit 6 is entirely impossible, thus allowing a driver to, for example, continue driving the vehicle and head to a repair shop or some place where the vehicle can be fixed.

With a configuration of the inverter unit 22 including the determiner 39, the magnetic force estimator 38 and the abnormalities-responsive motor drive limiter 40, an appropriate control can be initiated more quickly than with a configuration of the ECU 21 including the same components. Furthermore, with such a configuration, the load on the ECU 21, whose complexity is increasing hand-in-hand with its sophistication, can be reduced.

In a configuration where the inverter unit 22 includes components including the determiner 39, an abnormalities notifier 41 may send information indicating abnormalities to the ECU 21, if the determiner 39 determines that the estimated magnetic force falls outside the defined acceptable range. The ECU 21 performs general control of the vehicle. Thus, in a configuration where the inverter unit 22 may be caused to perform control such as a drive limit control, by notifying the ECU 21 of abnormalities, the ECU 21 can correspondingly perform an appropriate control of the vehicle in general.

The abnormalities display controller 42 may, if the determiner 39 determines that the estimated magnetic force falls outside the defined acceptable range, cause a vehicle driver display 27 to show a presentation that indicates abnormalities. Such a configuration of causing a vehicle driver display 27 to show a presentation that indicates abnormalities allows a driver to be quickly aware of the abnormalities and to promptly take appropriate measures or actions such as stopping the vehicle, driving the vehicle at a slower speed, or heading to a repair shop.

In the embodiment under discussion, the motor unit 6 may form an in-wheel motor drive system 8. An in-wheel motor drive system 8, due to its smaller size, may include a motor unit 6 that generates rapid rotation and that a reducer unit 7 includes a cycloidal reducer having a reduction ratio of 6 or greater (which, in a particular embodiment, may achieve a reduction ratio of 10 or greater). Rapid rotation of a motor unit 6 may lead to increase in eddy current-induced core loss, which means increase of the heat that may be generated by eddy current loss. This may result in an elevated temperature of a permanent magnet structure 80 of the motor unit 6, thus facilitating heat-induced demagnetization of the permanent magnet structure 80. The provision of components such as a magnetic force estimator 38, a determiner 39 and an abnormalities-responsive motor drive limiter 40 according to the embodiment under discussion can be more effective in such a situation.

Although the present invention has been described in connection with preferred embodiments with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

REFERENCE SIGNS

1: Vehicle body
2, 3: Wheel
4, 5: Wheel bearing unit
6: Motor unit
7: Reducer unit
8: In-wheel motor drive system
9, 10: Electromechanical brake
11: Turning mechanism
12: Steering mechanism
21: ECU
22: Inverter unit
24: Rotation sensor
27: Display
28: Power circuitry
29: Motor control circuitry
31: Inverter
32: PWM driver
33: Motor drive controller
35: Current sensor
36: Angle sensor
37: Voltage sensor
38: Magnetic force estimator
39: Determiner
40: Abnormalities-responsive motor drive limiter
41: Abnormalities notifier
42: Abnormalities display controller

What is claimed is:

1. An electric vehicle comprising:
a synchronous motor unit configured to drive a wheel;
an ECU which is an electronic control unit configured to perform general control of the vehicle;
an inverter unit, the inverter unit including:
a power circuitry including an inverter configured to convert a DC power from a battery unit into an AC power used to drive the motor unit; and
a motor control circuitry configured to control at least the power circuitry in accordance with control from the ECU; and
a plurality of sensors including at least two sensors selected from a group consisting of a sensor configured to sense a rotational frequency of the motor unit, a sensor configured to sense a motor voltage of the motor unit and a sensor configured to sense a motor current of the motor unit;
the inverter unit or the ECU including:
a magnetic force estimator configured to estimate, according to a predefined rule, a magnetic force of a permanent magnet structure associated with a motor rotor of the motor unit, based on at least two detection signals produced from the sensors that are selected from a group consisting of a detection signal indicating a rotational frequency of the motor unit, a detection signal indicating a motor voltage of the motor unit and a detection signal indicating a motor current of the motor unit.

2. The electric vehicle as claimed in claim 1, wherein the inverter unit or the ECU further includes a determiner configured to determine if the magnetic force estimated by the magnetic force estimator falls within a defined acceptable range.

3. The electric vehicle as claimed in claim 2, wherein the inverter unit or the ECU further includes an abnormalities-responsive motor drive limiter configured to, if the determiner determines that the estimated magnetic force falls outside the defined acceptable range, limit an output of the inverter unit.

4. The electric vehicle as claimed in claim 3, wherein the inverter unit includes the determiner, the magnetic force estimator and the abnormalities-responsive motor drive limiter.

5. The electric vehicle as claimed in claim 4, wherein the inverter unit further includes an abnormalities notifier configured to send information indicating abnormalities to the ECU, if the determiner determines that the estimated magnetic force falls outside the defined acceptable range.

6. The electric vehicle as claimed in claim 2, wherein the ECU includes an abnormalities display controller configured to, if the determiner determines that the estimated magnetic force falls outside the defined acceptable range, cause a vehicle driver display to show a presentation that indicates abnormalities.

7. The electric vehicle as claimed in claim 1, wherein the motor unit includes an interior permanent magnet synchronous motor including a neodymium permanent magnet.

8. The electric vehicle as claimed in claim 1, further comprising:
a wheel bearing unit; and
a reducer unit;
wherein the motor unit, together with the wheel bearing unit and the reducer unit, forms an in-wheel motor drive system that is partly or entirely disposed within the wheel.

9. The electric vehicle as claimed in claim 1, further comprising:
a reducer unit configured to produce rotation with a speed that is reduced with respect to that of rotation of the motor unit,
wherein the reducer unit has a reduction ratio of 6 or greater.

10. The electric vehicle as claimed in claim 1, further comprising:
a reducer unit configured to produce rotation with a speed that is reduced with respect to that of rotation of the motor unit,
wherein the reducer unit comprises a cycloidal reducer.

* * * * *